United States Patent
Du et al.

(10) Patent No.: US 12,515,521 B2
(45) Date of Patent: Jan. 6, 2026

(54) METHOD FOR CONTROLLING VEHICLE EQUIPMENT, ELECTRONIC EQUIPMENT, AND STORAGE MEDIUM

(71) Applicant: PATEO CONNECT+ Technology (Shanghai) Corporation, Shanghai (CN)

(72) Inventors: Fang Du, Shanghai (CN); Hongren Shi, Shanghai (CN)

(73) Assignee: PATEO CONNECT+ Technology (Shanghai) Corporation, Shanghai (CN)

( * ) Notice: Subject to any disclaimer, the term of this patent is extended or adjusted under 35 U.S.C. 154(b) by 113 days.

(21) Appl. No.: 18/613,995

(22) Filed: Mar. 22, 2024

(65) Prior Publication Data
US 2024/0227557 A1    Jul. 11, 2024

Related U.S. Application Data (63) Continuation of application No. PCT/CN2021/138777, filed on Dec. 16, 2021.

(30) Foreign Application Priority Data

Sep. 24, 2021   (CN) .......................... 202111126034.1

(51) Int. Cl.
*B60K 35/10*      (2024.01)
*B60K 35/80*      (2024.01)
*H04W 4/02*       (2018.01)

(52) U.S. Cl.
CPC .............. *B60K 35/10* (2024.01); *B60K 35/80* (2024.01); *H04W 4/025* (2013.01); *B60K 2360/566* (2024.01); *B60K 2360/573* (2024.01)

(58) Field of Classification Search
CPC .. B60K 35/10; B60K 35/80; B60K 2360/566; B60K 2360/573; H04W 4/025; H04W 4/026; B60R 16/02; B60R 16/0231
See application file for complete search history.

(56) References Cited

U.S. PATENT DOCUMENTS

| 10,285,031 B2 * | 5/2019 | Toya ....................... H04L 67/12 |
| 2016/0061613 A1 | 3/2016 | Jung et al. |

FOREIGN PATENT DOCUMENTS

| CN | 102420627 A | 4/2012 |
| CN | 103412648 A | 11/2013 |

(Continued)

OTHER PUBLICATIONS

The World Intellectual Property Organization (WIPO) International Search Report for PCT/CN2021/138777 Jun. 21, 2022 8 Pages (including translation).

*Primary Examiner* — Yuen Wong
(74) *Attorney, Agent, or Firm* — ANOVA LAW GROUP, PLLC (57) ABSTRACT

A method for controlling equipment of a vehicle includes obtaining direction information of a terminal and direction information of a vehicle based on a horizontal direction of a geomagnetic field, obtaining relative position information between the terminal and the vehicle, determining relative direction information between the terminal and the vehicle according to the direction information of the terminal and the direction information of the vehicle, determining equipment pointed to by the terminal according to the relative position information, the relative direction information, and position information of the equipment of the vehicle relative to the vehicle, and controlling the pointed equipment through the terminal or displaying information of the pointed equipment on the terminal.

20 Claims, 5 Drawing Sheets

(56) References Cited

FOREIGN PATENT DOCUMENTS

| | | |
|---|---|---|
| CN | 104742833 A | 7/2015 |
| CN | 106296881 A | 1/2017 |
| CN | 206106899 U | 4/2017 |
| CN | 106696899 A | 5/2017 |
| CN | 107389059 A | 11/2017 |
| CN | 107564329 A | 1/2018 |
| CN | 109298830 A | 2/2019 |
| CN | 109910783 A | 6/2019 |
| CN | 111405656 A | 7/2020 |
| CN | 111787507 A | 10/2020 |
| CN | 111907443 A | 11/2020 |
| CN | 112365734 A | 2/2021 |
| CN | 113093104 A | 7/2021 |
| DE | 102014208016 A1 | 10/2015 |
| JP | 2021101364 A | 7/2021 |

\* cited by examiner

METHOD FOR CONTROLLING VEHICLE EQUIPMENT, ELECTRONIC EQUIPMENT, AND STORAGE MEDIUM

CROSS-REFERENCE TO RELATED APPLICATION

This application is a continuation of International Application No. PCT/CN2021/138777, filed Dec. 16, 2021, which claims priority to Chinese Patent application Ser. No. 202111126034.1, filed on Sep. 24, 2021, the entire contents of both of which are incorporated herein by reference.

TECHNICAL FIELD

The present disclosure relates to the control technology field and, more particularly, to a method for controlling the equipment of a vehicle, electronic equipment, and a storage medium.

BACKGROUND

With the rapid development of smart vehicles, interactions between vehicles and people become more and more diversified. Users expect to perform command control or information interaction on the equipment of a vehicle through natural speech recognition or through a terminal, such as a mobile phone when entering a vehicle.

However, in an existing process of performing the command control or information interaction on the vehicle equipment through the terminal, such as the mobile phone, an object often cannot be accurately controlled.

SUMMARY

Embodiments of the present disclosure provide a method for controlling equipment of a vehicle. The method includes obtaining direction information of a terminal and direction information of a vehicle based on a horizontal direction of a geomagnetic field, obtaining relative position information between the terminal and the vehicle, determining relative direction information between the terminal and the vehicle according to the direction information of the terminal and the direction information of the vehicle, determining a pointing line of the terminal according to the relative position information and the relative direction information, determining area information pointed to by the terminal according to an error adjustment range and an intersection point between the pointing line and the vehicle, determining a plurality of pieces of equipment in an area pointed by the terminal according to the area information and position information, determining equipment pointed to by the terminal according to the relative position information, the relative direction information, and position information of the equipment of the vehicle relative to the vehicle, and controlling the pointed equipment through the terminal or displaying information of the pointed equipment on the terminal.

Embodiments of the present disclosure provide an electronic equipment, including at least one processor and a memory. The memory is communicatively connected to the at least one processor and stores processor-executable instructions that, when executed by the at least one processor, cause the processor to obtain direction information of a terminal and direction information of a vehicle based on a horizontal direction of a geomagnetic field, obtain relative position information between the terminal and the vehicle, determine relative direction information between the terminal and the vehicle according to the direction information of the terminal and the direction information of the vehicle, determine a pointing line of the terminal according to the relative position information and the relative direction information, determine area information pointed to by the terminal according to an error adjustment range and an intersection point between the pointing line and the vehicle, determine a plurality of pieces of equipment in an area pointed by the terminal according to the area information and position information, determine equipment pointed to by the terminal according to the relative position information, the relative direction information, and position information of the equipment of the vehicle relative to the vehicle, and control the pointed equipment through the terminal or display information of the pointed equipment on the terminal.

Embodiments of the present disclosure provide a non-transitory computer-readable storage medium storing a computer program that, when the computer program is executed by a processor, causes the processor to obtain direction information of a terminal and direction information of a vehicle based on a horizontal direction of a geomagnetic field, obtain relative position information between the terminal and the vehicle, determine relative direction information between the terminal and the vehicle according to the direction information of the terminal and the direction information of the vehicle, determine a pointing line of the terminal according to the relative position information and the relative direction information, determine area information pointed to by the terminal according to an error adjustment range and an intersection point between the pointing line and the vehicle, determine a plurality of pieces of equipment in an area pointed by the terminal according to the area information and position information, determine equipment pointed to by the terminal according to the relative position information, the relative direction information, and position information of the equipment of the vehicle relative to the vehicle, and control the pointed equipment through the terminal or display information of the pointed equipment on the terminal.

According to the method for controlling the vehicle equipment, the electronic equipment, and the storage medium of embodiments of the present disclosure, the electronic equipment can obtain the relative direction information between the terminal and the vehicle based on the direction information of the terminal and the direction information of the vehicle with reference to the horizontal direction of the geomagnetic field. The electronic equipment can also determine the equipment pointed to by the terminal based on the relative direction information to control or interact with the vehicle equipment. Compared to determining the equipment pointed to by the terminal only based on the direction information of the terminal, the change of the direction of the vehicle is considered with the relative direction information. Thus, the equipment pointed to by the terminal can be more accurately determined. Therefore, the control and interaction with the vehicle equipment can be more accurate.

DETAILED DESCRIPTION OF EMBODIMENTS

To better understand the present disclosure, various aspects of the present disclosure will be described in more detail with reference to the accompanying drawings. These detailed descriptions are descriptions of exemplary embodiments of the present disclosure only and are not intended to limit the scope of the present disclosure. Throughout the specification, a same reference numeral can refer to a same element. The expression "and/or" includes any and all combinations of one or more of the associated listed items.

Expressions such as "comprise," "include," "have," "contain," and/or "comprising" in the specification are open rather than closed expressions, which indicates that stated features, devices, and/or members exist. However, one or more other features, devices, members, and/or a combination thereof cannot be excluded. In addition, when an expression of "at least one of" is used in front of the list of the listed items, the expression can decorate the whole list not only a single item in the list. Moreover, when embodiments of the present disclosure are described, "can" can be used "in one or more embodiments of the present disclosure." Additionally, the term "exemplary" is intended to refer to an example or embodiment.

Unless otherwise defined, all terms (including technical terms and scientific terms) used herein have the same meaning as commonly understood by those of ordinary skill in the art. The term (e.g., the terms defined in a commonly used dictionary) can be interpreted to have a meaning consistent with the meaning in the context of the related technology. The term should not be interpreted with idealized or overly formal meanings unless specified in the present disclosure.

When there is no conflict, embodiments of the present disclosure and features in embodiments can be combined with each other. In addition, unless specified or contradictory to the context, the specific steps included in the method described in the present disclosure are not necessarily limited to the recited order but can be performed in any order or in parallel. The present disclosure is described in detail below with reference to the accompanying drawings and embodiments.

Figure 1:
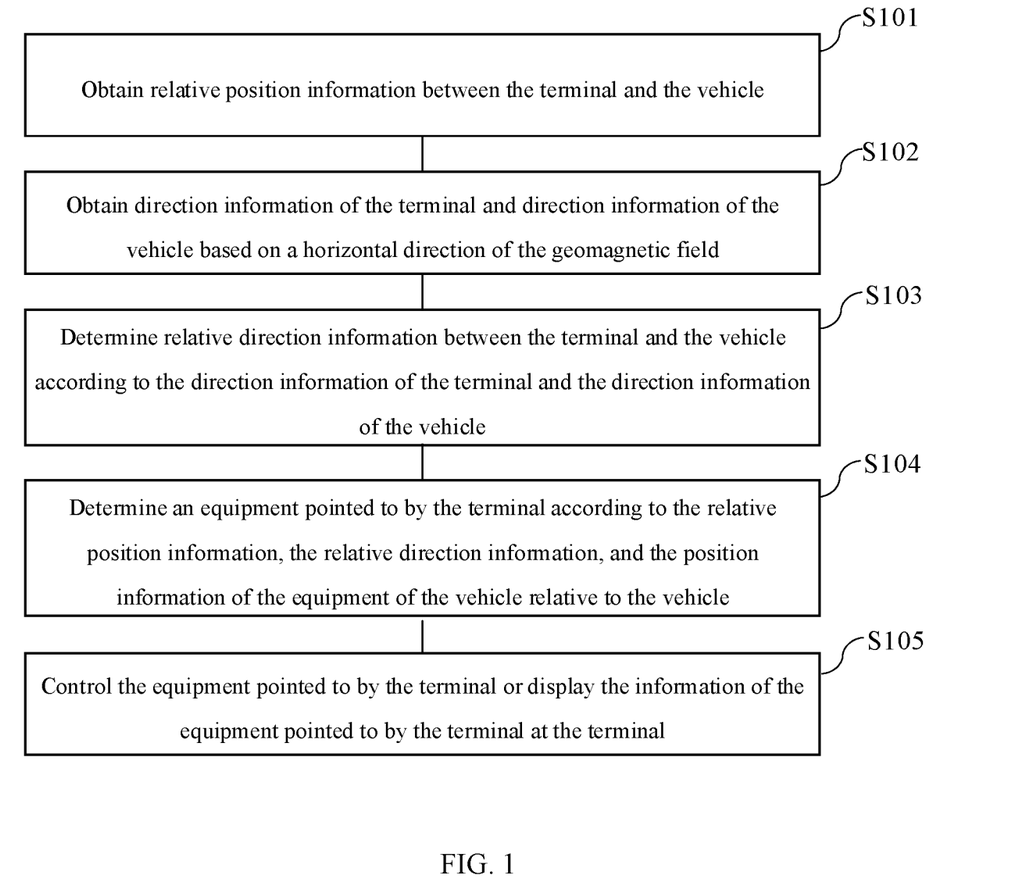
FIG. 1 is a schematic flowchart of a method for controlling equipment of a vehicle according to some embodiments of the present disclosure.

FIG. 1 is a schematic flowchart of a method for controlling equipment of a vehicle according to some embodiments of the present disclosure. The method for controlling the vehicle equipment can be executed by an electronic equipment. The electronic equipment can be, for example, a terminal, a server communicatively connected to the terminal, etc. As shown in FIG. 1, the method for controlling the vehicle equipment of the present disclosure, for example, includes the following processes.

At S101, relative position information is obtained between the terminal and the vehicle.

At S102, direction information of the terminal and direction information of the vehicle are obtained based on a horizontal direction of the geomagnetic field.

At S103, relative direction information between the terminal and the vehicle is determined according to the direction information of the terminal and the direction information of the vehicle.

At S104, equipment pointed to by the terminal is determined according to the relative position information, the relative direction information, and the position information of the equipment of the vehicle relative to the vehicle.

At S105, the equipment pointed to by the terminal is controlled, or the information of the equipment pointed to by the terminal is displayed at the terminal.

According to the method for controlling the vehicle equipment of embodiments of the present disclosure, the electronic equipment can be configured to obtain the relative direction information between the terminal and the vehicle based on the direction information of the terminal and the direction information of the vehicle with the horizontal direction of the geomagnetic field as a reference. The electronic equipment can be also configured to determine the equipment pointed to by the terminal based on the relative direction information to control or interact with the vehicle equipment. Compared to determining the equipment pointed to by the terminal only based on the direction information of the terminal, a direction change of the vehicle can be considered in the relative direction information. Thus, the equipment pointed to by the terminal can be more accurately determined to perform controlling or information interaction on the vehicle equipment.

In some embodiments of the present disclosure, in process S101, the electronic equipment obtains the relative position information between the terminal and the vehicle through a manner, including but not limited to embodiments of the present disclosure.

In some embodiments, the electronic equipment can be configured to obtain the relative position information between the terminal and the vehicle through a positioning anchor of the vehicle and a positioning module of the terminal matching with the positioning anchor. In some embodiments, if the positioning anchor is installed on the vehicle, the electronic equipment can obtain the relative position information between the terminal and the vehicle through the positioning anchor and the matching positioning module.

Figure 2:
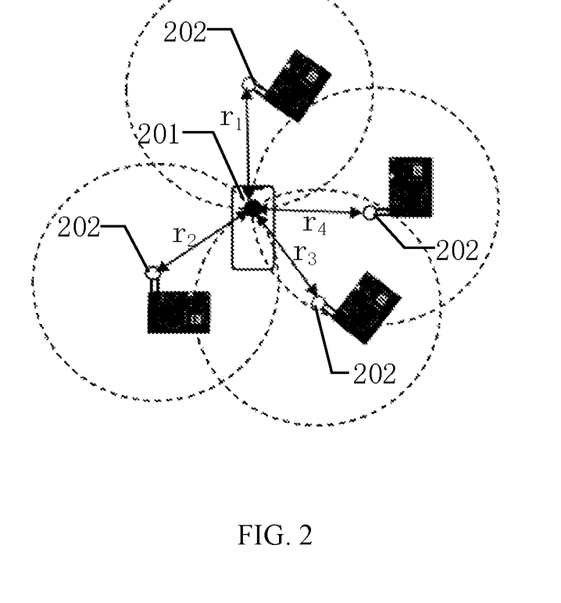
FIG. 2 is a schematic diagram showing positions of an ultra wide-band (UWB) of a terminal and a UWB positioning anchor according to some embodiments of the present disclosure.

For example, the positioning module can include an ultra-wideband (UWB) module. Through the UWB module of the terminal and a UWB positioning anchor on the vehicle, the relative position information between the terminal and the vehicle can be determined. In some embodiments, when one UWB module is installed at the terminal, and four UWB positioning anchors are installed at the vehicle, the positions of the UWB module of the terminal and the UWB positioning anchors are shown in FIG. 2. Based on the formula, distance=pulse time of flight×speed of light/2, distances (r1, r2, r3, and r4) between the UWB positioning anchors 202 and the UWB module 201 can be measured by using the pulse time of flight (TOF) between the UWB module 201 of the terminal and the UWB positioning anchors 202. According to the distances between the UWB positioning anchors and the UWB module, the relative position between the UWB module and the UWB positioning anchors can be determined, that is, a relative positional relationship between the terminal and the vehicle. Since the positioning accuracy of the UWB can reach a centimeter level, the relative position information with higher precision can be provided to the electronic equipment.

For another example, the positioning module can include a Bluetooth module. The relative position information between the terminal and the vehicle can be determined through the Bluetooth module of the terminal and a Bluetooth positioning anchor on the vehicle.

Without departing from the teaching of the present disclosure, another module can also be used as the positioning module to obtain the relative position information between the terminal and the vehicle, which is not limited by the present disclosure.

In some other embodiments, the electronic equipment can be configured to obtain absolute position information of the terminal through the positioning module of the terminal, obtain absolute position information of the vehicle through the positioning module of the vehicle, and determine the relative position information between the vehicle and the terminal according to the absolute position information of the terminal and the absolute position information of the vehicle. The positioning module of the terminal can include, for example, a high-precision positioning module such as Global Positioning System (GPS) or Global Navigation Satellite System (GNSS). The positioning module of the vehicle can include, for example, a high-precision positioning module such as GPS or GNSS.

In some other embodiments, the electronic equipment can be configured to obtain the absolute position information of the terminal through a positioning anchor of a parking lot and the positioning module of the terminal matching the positioning anchor, obtain the absolute position information of the vehicle through the positioning anchor point of the parking lot and the positioning module of the vehicle matching the positioning anchor, and determine the relative position information according to the absolute position information of the terminal and the absolute position information of the vehicle. In some embodiments, when the vehicle is parked in the parking lot, if the positioning anchor point is not installed on the vehicle, or the positioning anchor point is installed inside the vehicle and the terminal is located outside the vehicle, or the positioning anchor is installed inside the vehicle and the terminal is outside the vehicle, or the positioning anchor is outside the vehicle and the terminal is inside the vehicle, the electronic equipment can perform positioning on the terminal and the vehicle through the positioning anchor installed in the parking lot and calculate the relative position information between the terminal and the vehicle according to the absolute position information of the terminal and the absolution position information of the vehicle. Since the positioning anchor is installed in the parking lot, the electronic equipment can obtain the relative position information between the terminal and the vehicle through the positioning anchor of the parking lot when the signal of the high-precision positioning module such as the terminal or the GPS is not good.

For example, a plurality of UWB modules can be installed in the parking lot as positioning anchors. Each of the terminal and the vehicle can be installed with a UWB module. The terminal and the vehicle can communicate with the plurality of UWB modules in the parking lot through the UWB modules installed at the terminal and the vehicle. The absolute position information of the terminal and the absolute position information can be calculated by using the pulse time of flight between the UWB modules. The relative position information between the terminal and the vehicle can be obtained based on the absolute position information of the terminal and the absolute position information of the vehicle.

In some embodiments of the present disclosure, in process S102, the electronic equipment obtaining the direction information of the terminal can include, for example, obtaining the direction information of the terminal at least through an angular velocity sensor of the terminal and a magnetic sensor of the terminal.

In some embodiments, the direction information of the terminal can include, for example, a horizontal deviation angle of the terminal relative to the horizontal direction of the geomagnetic field and a pitch angle of the terminal relative to the horizontal direction of the geomagnetic field. The angular velocity sensor of the terminal can be configured to measure information such as a movement angle and the movement direction of the terminal. The magnetic sensor of the terminal can be configured to obtain the direction of the magnetic field around the terminal. Based on data detected by the angular velocity sensor and the magnetic sensor, the direction information of the terminal can be calculated.

In some other embodiments, the electronic equipment can also be configured to obtain the direction information of the terminal through an acceleration sensor, an angular velocity sensor, and a magnetic sensor of the terminal. The acceleration sensor of the terminal can be configured to obtain information such as a movement acceleration, an acceleration direction, a speed direction, and a movement distance of the terminal. The data detected by the acceleration sensor of the terminal can also be used as a reference for calculating the direction information of the terminal. Thus, the calculation result can be more accurate.

Figure 3:
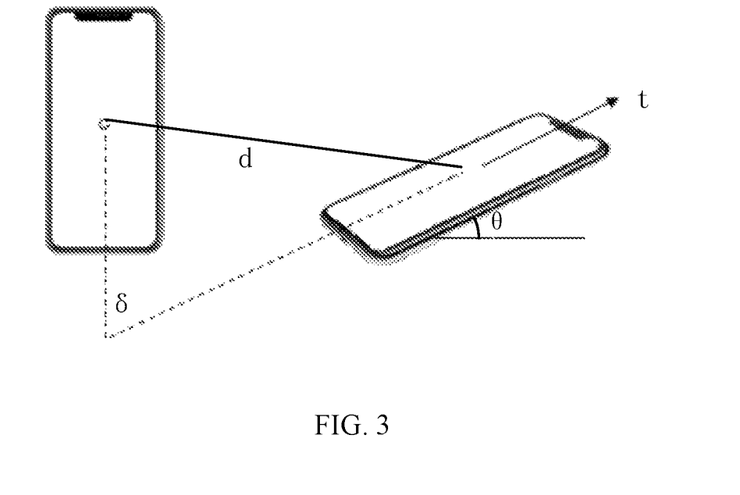
FIG. 3 is a schematic diagram showing a movement process of a terminal according to some embodiments of the present disclosure.

For example, as shown in FIG. 3, when the user operates the terminal, the movement distance calculated by the acceleration sensor is d, a horizontal deviation angle in a three-axis deviation angle δ measured by the angular velocity sensor is θ, and the direction of the earth horizontal magnetic field is t. The electronic equipment can be configured to calculate the direction information of the terminal relative to the horizontal direction of the geomagnetic field according to the above parameters.

Without departing from the teaching of the present disclosure, the direction information of the terminal can also be obtained in another manner, which is not limited to the present disclosure.

In some embodiments, the magnetic sensor of the terminal can include, for example, an electronic compass. The electronic compass of the terminal can be configured to, for example, measure a strength and a direction of the magnetic field around the terminal to position an orientation of the terminal, such as current angles between the terminal and the four directions of east, west, north, and south, which is similar to a compass. Therefore, the electronic equipment can obtain the horizontal direction of the geomagnetic field of the terminal, for example, through an electronic compass. In some other embodiments, another magnetic sensor can also be selected to detect the horizontal direction of the geomagnetic field of the terminal, which is not limited to the present disclosure.

In some embodiments of the present disclosure, the electronic equipment obtaining the direction information of the vehicle includes but not limited to embodiments of the present disclosure In manner 1, the electronic equipment can be configured to obtain the direction information of the vehicle at least through the angular velocity sensor and the magnetic sensor of the vehicle. The direction information of the vehicle can include, for example, the horizontal deviation angle of the vehicle relative to the horizontal direction of the geomagnetic field and the pitch angle of the vehicle relative to the horizontal direction of the geomagnetic field. The angular velocity sensor of the vehicle can be configured to measure information such as the movement angle and the movement direction of the vehicle. The magnetic sensor of the vehicle can be configured to obtain the direction of the magnetic field around the vehicle. Based on the data detected by the angular velocity sensor and the magnetic sensor, the direction information of the vehicle can be calculated.

In some embodiments, the electronic equipment can also obtain the direction information of the vehicle through the acceleration sensor, the angular velocity sensor, and the magnetic sensor of the vehicle. The acceleration sensor of the vehicle can be configured to obtain information such as the movement acceleration, the acceleration direction, the speed direction, and the movement distance of the vehicle. The data detected by the acceleration sensor of the vehicle can be also used as a reference for calculating the direction information of the vehicle. Thus, a calculation result can be more accurate.

Without departing from the teaching of the present disclosure, the direction information of the vehicle can also be obtained in another manner, which is not limited to the present disclosure.

In some embodiments, the magnetic sensor of the vehicle can include, for example, the electronic compass. The electronic compass of the vehicle can be configured to, for example, measure the strength and the direction of the magnetic field around the vehicle to position the orientation of the vehicle, for example, the current angles between the vehicle and the four directions of east, west, north, and south. The electronic compass can be similar to the compass. Therefore, the electronic equipment can obtain the horizontal direction of the geomagnetic field of the vehicle, for example, through the electronic compass. The horizontal direction of the geomagnetic field of the vehicle can be further detected by another magnetic sensor, which is not limited to the present disclosure.

In some other embodiments, the electronic equipment can obtain the direction information of the vehicle through a plurality of positioning modules of the vehicle. In some embodiments, the positioning modules can be installed at different positions of the vehicle. The vehicle can calculate the absolute direction information of the vehicle according to position information detected by the positioning modules. The direction information of the vehicle can be calculated according to the absolute direction information of the vehicle and the horizontal direction information of the geomagnetic field where the vehicle is located.

In some embodiments, the horizontal direction of the geomagnetic field can be taken as a reference direction. The direction information of the terminal can include the horizontal deviation angle and the pitch angle of the terminal relative to the horizontal direction of the geomagnetic field. The direction information of the vehicle can include the horizontal deviation angle and the pitch angle of the vehicle relative to the geomagnetic field, which is taken as an example for illustration. Without departing from the teaching of the present disclosure, a horizontal due south direction, a horizontal due east direction, and a horizontal due west direction can be determined as the reference directions based on the horizontal direction of the geomagnetic field. The direction information of the terminal can include the horizontal deviation angle and the pitch angle of the terminal relative to the reference direction. The direction information of the vehicle can include the horizontal deviation angle and the pitch angle of the vehicle relative to the reference direction. The reference direction is not limited by the present disclosure.

In embodiments of the present disclosure, in process S103, when considering that a positioning module is mounted at the terminal (in FIG. 2), distances between the UWB module and the UWB positioning anchors may not change regardless of the orientation of the terminal. Thus, the relative direction information between the terminal and the vehicle can not be obtained based on the positioning module. In some embodiments of the present disclosure, by taking the horizontal direction of the geomagnetic field as a reference, the direction information of the terminal and the direction information of the vehicle can be obtained to obtain the relative direction information between the terminal and the vehicle.

In some embodiments, the direction information of the terminal can include the horizontal deviation angle of the terminal relative to the horizontal direction of the geomagnetic field and the pitch angle of the terminal relative to the horizontal direction of the geomagnetic field. The direction information of the vehicle can include the horizontal deviation angle of the vehicle relative to the horizontal direction of the geomagnetic field and the pitch angle of the vehicle relative to the horizontal direction of the geomagnetic field. In process S103, according to the direction information of the terminal and the direction information of the vehicle, determining the relative direction information between the terminal and the vehicle can include, for example, according to the horizontal deviation angle of the terminal relative to the horizontal direction of the geomagnetic field and the horizontal direction of the vehicle relative to the geomagnetic field, calculating a horizontal deviation angle of the terminal relative to the vehicle, and according to the pitch angle of the terminal relative to the horizontal direction of the geomagnetic field and the pitch angle of the vehicle relative to the horizontal direction of the geomagnetic field, calculating the pitch angle of the terminal relative to the vehicle. In embodiments of the present disclosure, a magnetic sensor can be added to the vehicle. The magnetic sensor can be configured to obtain the direction information of the vehicle and calculate the relative direction information between the terminal and the vehicle with reference to the horizontal direction of the geomagnetic field. Thus, when only one positioning module is mounted at the terminal, the electronic equipment can obtain the relative direction information between the terminal and the vehicle to determine the equipment pointed to by the terminal, which improves the universality of the electronic equipment.

For example, if the horizontal deviation angle of the terminal relative to the horizontal direction of the geomagnetic field is 25 degrees, and the horizontal deviation angle of the vehicle relative to the horizontal direction of the geomagnetic field is 30 degrees, the horizontal deviation angle of the terminal relative to the vehicle is 5 degrees. If the pitch angle of the terminal relative to the horizontal direction of the geomagnetic field is 5 degrees (that is, 5 degrees up), and the pitch angle of the vehicle relative to the horizontal direction of the geomagnetic field is −5 degrees (that is, 5 degrees down), the pitch angle of the terminal relative to the vehicle is 10 degrees.

In embodiments of the present disclosure, in process S104, determining the equipment pointed to by the terminal can include obtaining the movement information of the terminal, and in response to the movement information of the terminal meeting a predetermined requirement, determining the equipment pointed to by the terminal according to the relative position information, the relative direction information, and the position information of the equipment of the vehicle relative to the vehicle. In some embodiments, to reduce the problem of false triggering the method for controlling the vehicle equipment of embodiments of the present disclosure when the user does not need to control the vehicle equipment. The electronic equipment can monitor the movement information of the terminal. When the movement information of the terminal indicates that the terminal satisfies the predetermined requirement, operations of determining the equipment pointed to by the terminal can be triggered. Setting a triggering condition for the method for controlling the vehicle equipment of embodiments of the present disclosure executed by the electronic equipment can reduce situations of false triggering to further reduce waste of computation resources and reduce the impact on the user of normally using the terminal.

In some embodiments, the movement information of the terminal can include the movement distance of the terminal relative to the vehicle. The predetermined requirement can include the movement distance being greater than a predetermined threshold. In some embodiments, when the user needs to control the vehicle equipment through the terminal, the mobile terminal can usually need to be executed. Therefore, the electronic equipment can determine whether the user has the intention to control the vehicle equipment according to the movement distance of the terminal relative to the vehicle.

Without departing from the teaching of the present disclosure, another predetermined requirement can also be set to more accurately determine whether the user has the intention to control the vehicle equipment, which is not limited by the present disclosure.

Without departing from the teaching of the present disclosure, the vehicle equipment can include, for example, various pieces of equipment mounted on the vehicle such as an air conditioner, a tire, a rear trunk, and a charging port of the vehicle, which is not limited by the present disclosure.

In embodiments of the present disclosure, in process S105, a manner in which the electronic equipment controls the pointed equipment through the terminal can include but is not limited to embodiments of the present disclosure.

In some embodiments, the electronic equipment can display a user interface of the pointed equipment on the terminal. The pointed equipment can be controlled through the user interface. In some embodiments, when the terminal points to a certain equipment of the vehicle, the user interface can be popped up on the screen of the terminal to prompt the user that the corresponding equipment can be operated. The user interface of the equipment can include, for example, a control button and a state display window of the equipment. The state display window can be configured to display the equipment information. The equipment information can include, for example, the state information of the equipment. When the user triggers the control button, the terminal can send an operation instruction corresponding to the control button to the vehicle. Thus, the vehicle can control the pointed equipment to execute the operation instruction.

In some embodiments, the electronic equipment can collect user operation behavior through the terminal. If the user operation behavior indicates to close the user interface, the terminal can be controlled to close the user interface. When the user no longer needs to control the equipment, the electronic equipment can exit the control mode for the vehicle equipment by sliding the user interface or clicking a close button. When the user needs to control the equipment again, the user can continue to point the terminal to the equipment to enter the control mode for the equipment again.

In some other embodiments, the electronic equipment can be configured to obtain information such as a user operation gesture collected by the terminal, determine an operation instruction corresponding to the user operation gesture, and transmit the determined operation instruction to the vehicle. The vehicle can control the pointed equipment to execute the determined operation instruction.

For example, the pointed equipment can be an air conditioner, and the user operation gesture collected by the terminal can be to swipe the screen to the right or move the terminal to the right. The operation instruction corresponding to the user operation gesture can be increasing the temperature by 1 degree. The electronic equipment can send the operation instruction of increasing the temperature by 1 degree to the vehicle. Thus, the vehicle can increase the temperature of the air conditioner by 1 degree.

Without departing from the teaching of the present disclosure, the electronic equipment can also control the pointed equipment through the terminal in another manner, which is not limited to the present disclosure.

In embodiments of the present disclosure, the electronic equipment can be, for example, the terminal. Each of the positioning modules of the terminal and the vehicle can include a UWB module. The terminal can establish a communication connection with the vehicle through the UWB modules. Thus, the terminal can send the operation instruction to the vehicle. Since the communication manner of the UWB module is a short distance communication, which can be used to reduce the situation of stealing the vehicle caused by relay attacks.

Without departing from the teaching of the present disclosure, the operation instruction can also be transmitted in another manner, which is not limited to the present disclosure.

In embodiments of the present disclosure, displaying the information of the pointed equipment on the terminal can include, for example, displaying the user interface of the pointed equipment on the terminal and displaying the information of the pointed equipment through the user interface. The information of the pointed equipment can include the state information of the pointed equipment. For example, if the pointed equipment is the tire, the information of the pointed equipment can include, for example, tire pressure, etc. If the pointed equipment is the air conditioner, the information of the pointed equipment can include, for example, an operation mode and temperature. If the pointed equipment is a charging port, the information of the pointed equipment can include, for example, the electric power of the vehicle, which is not listed here one-by-one.

Without departing from the teaching of the present disclosure, the information of the pointed equipment can also be displayed in another manner, which is not limited in the present disclosure.

In embodiments of the present disclosure, the electronic equipment can display the user interface of the pointed equipment on the terminal in the form of a floating window. In some embodiments, the terminal can display the user interface of the pointed equipment in a designated area of the display screen of the terminal in the form of a floating window. The user can choose whether to click the user interface as needed to subsequently control the pointed equipment or look up information about the pointed equipment. Compared to directly displaying the user interface of the pointed equipment in the display area of the terminal, a display area occupied by the floating window on the display screen can be smaller, which can reduce the impact of the user interface displayed under the false triggering on the current operation interface of the user.

In embodiments of the present disclosure, considering an error, an error of the relative position information, and an error of the relative direction information caused by a user operation process, in determining the equipment pointed to by the terminal, a pointing line of the terminal can be determined according to the relative position information and the relative direction information. In connection with the pointing line of the terminal, the position information of the vehicle equipment relative to the vehicle, and an error adjustment range, the equipment pointed to by the terminal can be determined.

In some embodiments, the area information pointed to by the terminal can be determined according to the error adjustment range and an intersection point between the pointing line and the vehicle. The equipment in the area pointed to by the terminal can be determined according to the area information pointed to by the terminal and the position information of the vehicle equipment relative to the vehicle. The equipment in the area pointed to by the terminal can be used as the equipment pointed to by the terminal. For example, a position point of the intersection point of the pointing line and the vehicle can be (10, 15, 17), and the error adjustment range can be, for example, ±10. Then, the area where a cube with vertices of (0, 5, 7), (20, 5, 7), (20, 25, 7), (0, 25, 7), (0, 5, 27), (20, 5, 27), (20, 25, 27), and (0, 25, 27) can be used as the area pointed to by the terminal. The equipment in the area can be the equipment pointed to by the terminal.

In some other embodiments, according to the error adjustment range and the position information of the vehicle equipment relative to the vehicle, extended area information of the vehicle equipment relative to the vehicle can be obtained. For the equipment, whether the interaction point of the pointing line and vehicle is located in the extended area of the vehicle equipment relative to the vehicle can be determined according to the extended area information of the vehicle equipment relative to the vehicle. If the interaction point is determined to be in the extended area, the equipment can be used as the equipment pointed to by the terminal. For example, the position point of the interaction point of the pointing line and the vehicle can be (10, 15, 17). Position information of a certain equipment relative to the vehicle can be (20, 23, 25). The error adjustment range can be, for example, an area where a cube with vertices of (10, 13, 15), (30, 13, 15), (30, 33, 15), (10, 33, 15), (10, 13, 35), (30, 13, 35), (30, 33, 35), and (10, 33, 55) is. Since (10, 15, 17) is located in the area where the cube is located, the equipment can be the pointed equipment.

Without departing from the teaching of the present disclosure, the impact of the error can also be reduced in another manner, which is not limited to the present disclosure.

In embodiments of the present disclosure, in the direction of the pointing line of the terminal relative to the vehicle, a plurality of pieces of equipment can be stacked. Thus, more than one piece of equipment can be pointed, or more than one piece of equipment can be determined to be pointed to by considering the error. For this situation, after the pointed equipment is determined, displaying the user interface of the pointed equipment at the terminal can include the following manners.

In some embodiments, in response to a number of the pieces of pointed equipment being greater than 1, the electronic equipment can display user interfaces of all the pieces of pointed equipment at the terminal.

In some other embodiments, in response to the number of the pieces of pointed equipment being greater than 1, the electronic equipment can select one piece of equipment from the plurality of pieces of pointed equipment and display the user interface of the selected equipment. In response to a switch instruction, a user interface of another equipment other than the selected equipment of the plurality of pieces of pointed equipment can be displayed at the terminal.

For example, the pointed equipment determined by the electronic equipment can include an air conditioner and a speaker. A user interface of the air conditioner can be displayed on the terminal first. If the equipment that the user actually needs to operate is not the air conditioner, the switch instruction can be triggered by swiping the screen. After detecting the switch instruction, the electronic equipment can close the user interface of the air conditioner and display a user interface of the speaker.

In some embodiments, selecting one piece of equipment from the plurality of pieces of pointed equipment can include, for example, determining the priority of each piece of pointed equipment and selecting the pointed equipment with the highest priority as the selected equipment.

For example, the plurality of pieces of pointed equipment determined by the electronic equipment can include the air conditioner and the speaker. The priority of the air conditioner can be 1, and the priority of the speaker can be 2. Then, the user interface of the air conditioner can be displayed on the terminal first. If the equipment that the user actually needs to operate is not the air conditioner, the switch instruction can be triggered by swiping the screen. After detecting the switch instruction, the electronic equipment can close the user interface of the air conditioner and display the user interface of the speaker.

Without departing from the teaching of the present disclosure, the priority of each equipment can be determined according to the use frequency of the equipment or the position information of the equipment relative to the vehicle, which is not limited to the present disclosure.

In embodiments of the present disclosure, the electronic equipment can be, for example, the terminal. In the interaction between the terminal and the vehicle, the terminal can be verified first. After the terminal is determined to be an authorized user, the vehicle can transmit data such as the direction information of the vehicle to the terminal and respond to the operation instructions transmitted by the terminal.

In embodiments of the present disclosure, displaying the user interface of the pointed equipment on the terminal can include, for example, obtaining permission information for the terminal, where the permission information of the terminal indicates a permission level of the terminal determined based on the relative position information, or the permission information of the terminal indicates the permission level preset for the terminal, and in response to the permission information of the terminal meeting the permission requirement of the pointed equipment, displaying the user interface of the pointed equipment on the terminal.

By taking the pointed equipment as a car window on the side of the driver seat, and the permission requirement of the car window being a first level as an example, if the relative position information between the terminal and the vehicle indicates that the user of the terminal is in the driver seat, the permission level of the driver seat is in the first level, the terminal can display the user interface of the car window on the driver side to control the car window switch. If the relative position information between the terminal and the vehicle indicates that the user of the terminal is in a passenger seat, and the permission level of the passenger seat is a second level, the terminal cannot display the user interface of the window on the driver seat side. That is, the control permission of the car window on the driver seat cannot be obtained.

Without departing from the teaching of the present disclosure, the permission level of the terminal at different positions in the vehicle and the permission level requirements of the pieces of equipment in the vehicle can be set as needed. That is, the pieces of vehicle equipment that are controllable by the user at different positions of the vehicle can be set as needed, which is not limited in the present disclosure.

In embodiments of the present disclosure, to improve vehicle safety, displaying the user interface of the pointed equipment on the terminal can include, for example, in response to the pointed equipment being a piece of in-vehicle equipment, determining whether the terminal is located in the vehicle according to the relative position information and if the terminal is determined to be located inside the vehicle, displaying the user interface of the pointed equipment on the terminal. That is, when the relative position information between the terminal and the vehicle shows that the terminal is located outside the vehicle, the terminal cannot operate the equipment inside the vehicle.

Without departing from the teaching of the present disclosure, the in-vehicle equipment can include, for example, the air conditioner, the speaker, the window, the door, etc. The out-of-vehicle equipment can include, for example, a tire, a front trunk, a rear trunk, etc. The in-vehicle equipment and the out-of-vehicle equipment can be classified as needed, which are not limited to the present disclosure.

By taking the electronic equipment as the terminal, the electronic equipment controlling the vehicle equipment is described with examples for two situations of the terminal inside and outside the vehicle.

Figure 4:
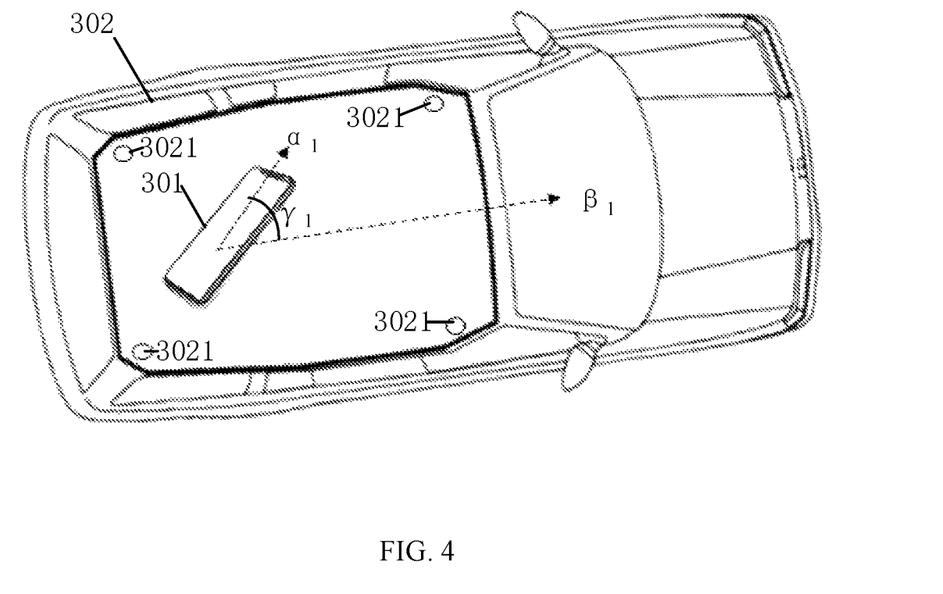
FIG. 4 is a schematic diagram showing a relative position of a terminal and a vehicle according to some embodiments of the present disclosure.
Figure 5:
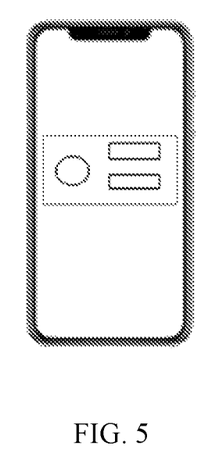
FIG. 5 is a schematic diagram of a user interface according to some embodiments of the present disclosure.

In some embodiments, if the terminal is inside the vehicle, as shown in FIG. 4, a terminal 301 interacts with a UWB module of a vehicle 302 through a UWB anchor 3021 inside the vehicle 302 to obtain relative position information between the terminal 301 and the vehicle 302. If no UWB positioning anchor 3021 is arranged inside the vehicle 302, the absolute position information of the terminal 301 can also be determined through a high-precision positioning module of the terminal 301 and obtain absolute position information of the vehicle 302 to determine the relative position information. For specific content, reference can be made to the above description, which is not repeated here. The terminal 301 can be configured to obtain direction information $\alpha 1$ of the terminal 301 relative to the horizontal direction of the geomagnetic field through an acceleration sensor, an angular velocity sensor, and a magnetic sensor of the terminal 301. The terminal 301 can be configured to obtain direction information $\beta 1$ of the vehicle 302 relative to the horizontal direction of the geomagnetic field determined according to the acceleration sensor, the angular velocity sensor, and the magnetic sensor of the vehicle 302. According to direction information $\alpha 1$ and direction information $\beta 1$, relative direction information $\gamma 1$ of the terminal 301 and the vehicle 302 can be obtained. According to the relative position information and the relative direction information, the equipment pointed to by the terminal 301 can be determined, for example, the air conditioner. As shown in FIG. 5, the terminal 301 can pop up the user interface of the pointed equipment on the display screen to control the pointed equipment or display the information about the pointed equipment.

Figure 6:
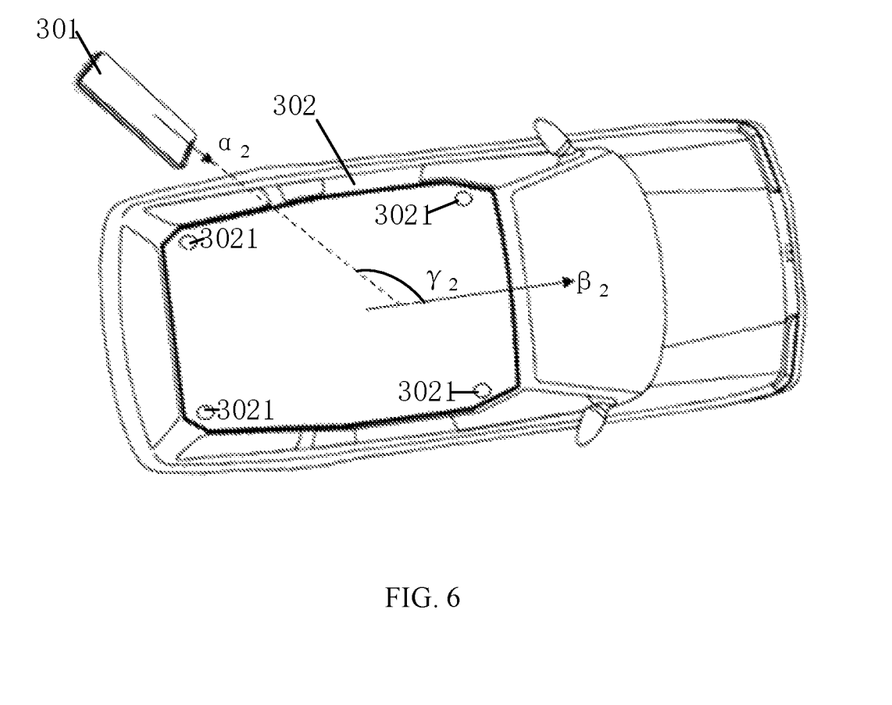
FIG. 6 is a schematic diagram showing a relative position of a terminal and a vehicle according to some other embodiments of the present disclosure.

In some embodiments, as shown in FIG. 6, if the terminal is located outside the vehicle, the terminal 301 interacts with the UWB module of the terminal 302 through the UWB anchor 3021 outside the vehicle 302 to obtain the relative position information between the terminal 301 and the vehicle 302. If no UWB positioning anchor 3021 is arranged outside the vehicle 302, the absolute position information of the terminal 301 can also be determined through the high-precision positioning module of the terminal 301 or the UWB positioning anchor arranged in the parking lot. Then, the absolute position information of the vehicle 302 can be obtained (with reference to the related description above) to determine the relative position information. For specific content, reference can be made to the above description, which is not repeated here. The terminal 301 can be configured to obtain direction information $\alpha 2$ of the terminal 301 relative to the horizontal direction of the geomagnetic field through the acceleration sensor, the angular velocity sensor, and the magnetic sensor of the terminal 301. The terminal 301 can be configured to obtain direction information $\beta 2$ of the vehicle 302 relative to the horizontal direction of the geomagnetic field determined by the vehicle 302 according to the acceleration sensor, the angular velocity sensor, and the magnetic sensor of the vehicle 302. According to direction information $\alpha 2$ and direction information $\beta 2$, relative direction information $\gamma 2$ of the terminal 301 and the vehicle 302 can be obtained. According to the relative position information and the relative direction information, the equipment pointed to by the terminal 301 can be determined, for example, the air conditioner. The terminal 301 can pop up the user interface of the pointed equipment on the display screen (in FIG. 5) to control the pointed equipment or display the information about the pointed equipment.

In some embodiments, the vehicle equipment pointed to by the terminal can be determined based on an atomic service. Furthermore, the vehicle equipment pointed to by the terminal can be searched, obtained, and displayed based on the atomic service, or the vehicle equipment pointed to by the terminal can be controlled. The atomic service can refer to, for example, an installation-free user application form provided based on Harmony OS. The atomic service can have an independent entry, and the user can directly trigger the service by, for example, clicking. The following describes the solution of determining the vehicle equipment pointed to by the terminal based on the atomic service in detail.

In some embodiments, when the terminal (for example, a smartphone) is within a predetermined distance range from the vehicle, the user can start the atomic service on the terminal for determining the pointed equipment to obtain the direction of the vehicle and the relative position relationship between the terminal and the vehicle. Based on this, the terminal can be configured to determine the equipment pointed to by the terminal in connection with the direction of the terminal.

In some other embodiments, the atomic service for determining the pointed equipment can also be started on the vehicle terminal to obtain the direction of the terminal and the relative position relationship between the terminal and the vehicle. Based on this, the vehicle terminal can be configured to determine the equipment pointed to by the terminal in connection with the direction of the vehicle.

After determining the equipment pointed to by the terminal, the user can send information to the vehicle through an information search atomic service to search, obtain, and display the information of the pointed equipment. In some other embodiments, the user can send a control instruction to the vehicle terminal through a control equipment atomic service to control the settings or operations of the pointed equipment.

The step division of the above methods is only for the clarity of description. During implementation, the steps can be combined into one step, or some steps can be divided into a plurality of steps, which are in the scope of the present disclosure as long as a same logic relationship is included. Insignificant modifications or designs added to or introduced in the algorithm or the process can be within the scope of the present disclosure, as long as the insignificant modification or designs do not change the core of the algorithm or the process.

Figure 7:
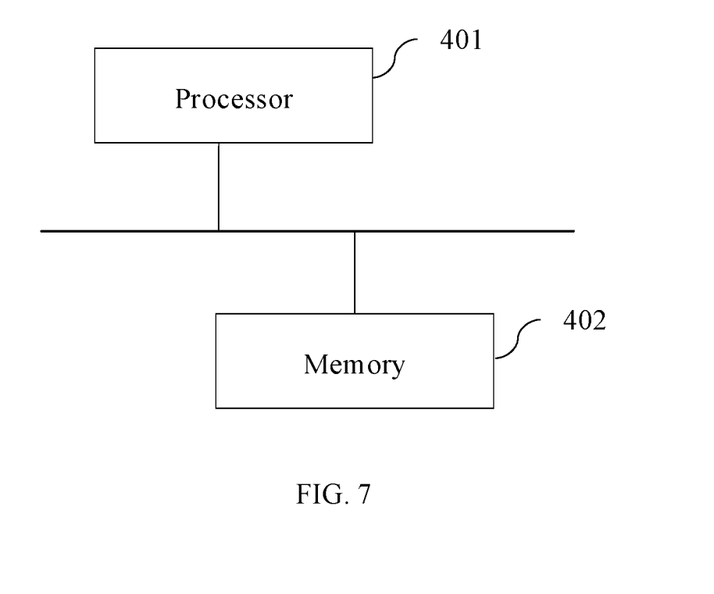
FIG. 7 is a schematic structural diagram of an electronic equipment according to some embodiments of the present disclosure.

Embodiments of the present disclosure also provide an electronic equipment. As shown in FIG. 7, the electronic equipment includes at least one processor 401 and a memory 402 communicatively connected to at least one processor 401. The memory can store Instructions executed by the at least one processor 401. The instructions can be executed by the at least one processor 401 to cause the at least one processor 401 can execute the method for controlling the vehicle equipment of embodiments of the present disclosure. The electronic equipment can include various forms of digital computers, such as laptops, desktops, workstations, personal digital assistants, servers, blade servers, mainframes, and other suitable computers. The electronic equipment can also include various forms of mobile devices, such as personal digital processors, cellular telephones, smart phones, and other similar computation devices. The components, the connections and relationships of the components, and the functions of the components of the present disclosure are merely exemplary and are not intended to limit the description and/or the implementation of the present disclosure.

Figure 8:
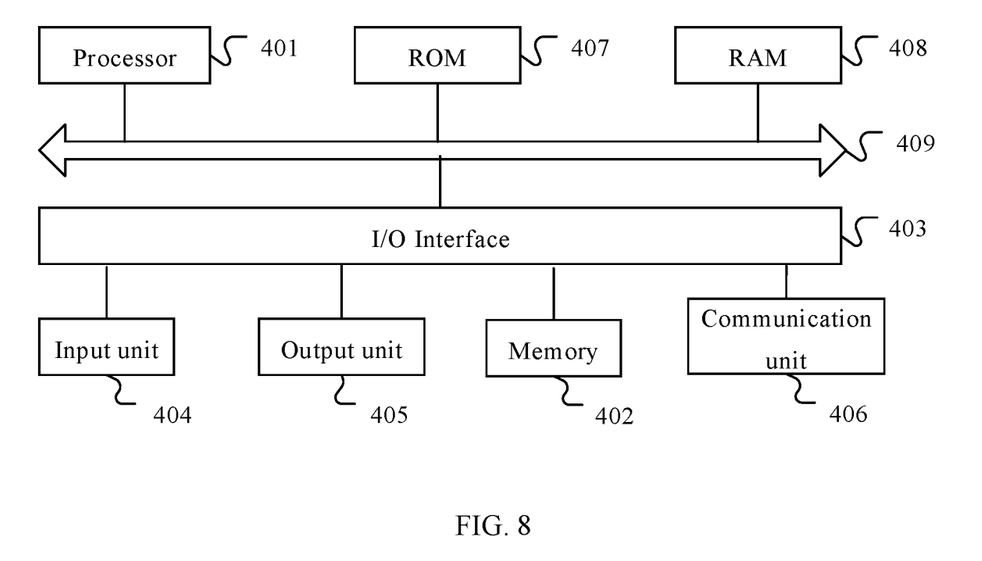
FIG. 8 is a schematic structural diagram of an electronic equipment according to some other embodiments of the present disclosure.

In embodiments of the present disclosure, as shown in FIG. 8, the electronic equipment further includes, for example, an I/O interface 403, an input unit 404, an output unit 405, a communication unit 406, a read-only memory (ROM) 407, and a random access memory (RAM) 408. In some embodiments, the processor 401 can be configured to execute various appropriate actions and processes according to computer programs stored in the ROM 407 or loaded from the memory 402 into the RAM 408. The RAM 408 can also store various programs and data necessary for the operation of the electronic equipment The processor 401, the ROM 407, and the RAM 408 are connected to each other through a bus 409. The I/O interface (input/output interface) 403 is also connected to the bus 408.

A plurality of members of the equipment are connected to the I/O interface 403 and include an input unit 404, such as a keyboard, a mouse, etc., an output unit 405, such as various types of displays, speakers, etc., a memory 402, such as a magnetic disk, an optical disk, etc., and a communication unit 406, such as a network card, a modem, a wireless communication transceiver, etc. The communication unit 406 can be configured to allow the equipment to exchange information/data with another equipment through a computer network such as the Internet and/or various telecommunication networks.

The processor 401 can be various general and/or special purpose processing members having processing and computing capabilities. Some examples of the processor 401 can include but are not limited to, central processing units (CPUs), graphics processing units (GPUs), various specialized artificial intelligence (AI) computing chips, various processors that run machine learning model algorithms, digital signal processing processors (DSP), and any suitable processors, controllers, microcontrollers, etc. The processor 401 can execute various methods and processes described above, for example, the vehicle intelligent marketing methods. For example, in some embodiments, the vehicle intelligent marketing methods can be implemented as a computer software program stored on a machine-readable medium, such as the memory 402. In some embodiments, a part or all of the computer program can be loaded and/or installed on the equipment via the ROM 407 and/or the communication unit 406. When the computer program is loaded into the RAM 408 and executed by the processor 401, one or more steps in the vehicle intelligent marketing methods described above can be executed. In some other embodiments, the processor 401 can be configured to perform the one or more steps of the vehicle intelligent marketing methods in any other appropriate manner (for example, by firmware).

Various implementations of the systems and techniques described above herein can be implemented in a digital electronic circuit system, an integrated circuit system, a field programmable gate array (FPGA), an application-specific integrated circuit (ASIC), an application specific standard product (ASSP), a system-on-chip system (SOC), a complex programmable logic device (CPLD), computer hardware, firmware, software, and/or a combination thereof. These embodiments can be implemented in one or more computer programs. One or more computer programs can be executed and/or interpreted on a programmable system including at least one programmable processor. The programmable processor can include a special-purpose or general-purpose programmable processor, which can receive data and instruction from a storage system, at least one input device, and at least one output device and transmit data and instruction to the storage system, the at least one input device, and the at least one output device.

Program codes for implementing the methods of the present disclosure can be written in any combination of one or more programming languages. The above program codes can be packaged into a computer program product. These program codes or computer program products can be provided to a processor or controller of a general-purpose computer, a special-purpose computer, or another programmable data processing equipment. Thus, when the program codes is executed by the processor 401, the defined functions/operations in the flowchart and/or block diagram can be implemented. The program codes can be executed entirely on the computer, partially on the computer, as a stand-alone software package partially on the computer and partially on a remote computer, or entirely on the remote computer or server.

Embodiments of the present disclosure further provide a computer-readable storage medium storing a computer program. When the computer program is executed by the processor, the processor can be configured to execute the method for controlling the vehicle equipment.

The computer-readable storage medium can include a tangible medium that can include or store a program for use by or in connection with an instruction execution system, device, or equipment. The computer-readable storage medium can be a computer-readable signal storage medium or a computer-readable storage medium. A computer-readable storage medium can include but is not limited to, electronic, magnetic, optical, electromagnetic, infrared, or semiconductor systems, equipment, devices, or any suitable combination thereof. More specific examples of the computer-readable storage medium can include one or more wire-based electrical connections, portable computer disks, hard disks, random access memory (RAM), read-only memory (ROM), erasable programmable read-only memory (EPROM or flash memory), fiber optics, compact disk read-only memory (CD-ROM), optical storage devices, magnetic storage devices, or any suitable combination thereof.

To provide the interaction with the user, the systems and techniques described herein can be implemented on the computer. The computer can include a display device (e.g., a CRT (cathode ray tube) or LCD (liquid crystal display) monitor) configured to display information to the user, and a keyboard and a pointing device (e.g., a mouse or a trackball). The user can provide the input to the computer through the keyboard and the pointing device. Other kinds of devices can also be configured to provide the interaction with the user. For example, the feedback provided to the user can be any form of sensory feedback (e.g., visual feedback, auditory feedback, or tactile feedback). The input from the user can be received in any form (including acoustic input, voice input, or tactile input).

The systems and techniques described here can be implemented on a computation system that includes back-end components (e.g., a data server), or a computation system that includes middleware components (e.g., an application server), or a computation system that includes front-end components (e.g., a user computer having a graphical user interface or a web browser. The user can interact with implementations of the systems and techniques described here through the graphical user interface or the web browser), or a computation system including any combination of the back-end components, the middleware components, or the front-end components. The components of the system can be interconnected by any form or medium of digital data communication (e.g., a communication network). Examples of communication networks can include a local area network (LAN), a wide area network (WAN), and the Internet.

The above description only illustrates embodiments of the present disclosure and the description of the applied technical principle. Those skilled in the art should understand that the scope of the present disclosure is not limited to the technical solution formed by a specific combination of the above technical features. The scope of the present disclosure should also cover other technical solutions formed by any combination of the above technical features or equivalent features of the above technical features without departing from the technical concept. For example, a technical solution can be formed by replacing the above-mentioned features with technical features with similar functions to (but not limited to) the present disclosure.

What is claimed is:

1. A method for controlling equipment of a vehicle comprising:

obtaining direction information of a terminal and direction information of the vehicle based on a horizontal direction of a geomagnetic field;

obtaining relative position information between the terminal and the vehicle;

determining relative direction information between the terminal and the vehicle according to the direction information of the terminal and the direction information of the vehicle;

determining a pointing line of the terminal according to the relative position information and the relative direction information;

determining area information pointed to by the terminal according to an error adjustment range and an intersection point between the pointing line and the vehicle;

determining a plurality of pieces of equipment in an area pointed by the terminal according to the area information and position information;

determining equipment pointed to by the terminal according to the relative position information, the relative direction information, and position information of the equipment of the vehicle relative to the vehicle; and controlling the pointed equipment through the terminal or displaying information about the pointed equipment on the terminal.

2. The method according to claim 1, wherein determining the equipment pointed to by the terminal includes:

obtaining movement information of the terminal;

in response to the movement information of the terminal satisfying a predetermined requirement, determining the equipment pointed to by the terminal according to the relative position information, the relative direction information, and the position information of the equipment of the vehicle relative to the vehicle.

3. The method according to claim 2, wherein:

the movement information of the terminal includes a movement distance of the terminal relative to the vehicle; and the predetermined requirement includes the movement distance being greater than a predetermined threshold.

4. The method according to claim 1, wherein controlling the pointed equipment through the terminal includes:

displaying a user interface of the pointed equipment on the terminal; and controlling the pointed equipment through the user interface.

5. The method according to claim 4, wherein displaying the user interface of the pointed equipment on the terminal includes:

displaying the user interface of the pointed equipment on the terminal through a floating window.

6. The method according to claim 4, wherein displaying the user interface of the pointed equipment on the terminal includes:

in response to a number of pieces of pointed equipment being greater than 1, selecting a piece of equipment from the number of pieces of pointed equipment, and displaying a user interface of the selected equipment; and in response to a switch instruction, displaying a user interface of another piece of equipment of the number of pieces of pointed equipment other than the selected equipment on the terminal.

7. The method according to claim 6, wherein selecting the equipment from the number of pieces of pointed equipment includes:

determining a priority of each of the number of pieces of pointed equipment; and
selecting a pointed equipment with a highest priority as the selected equipment.

8. The method according to claim 4, wherein displaying the user interface of the pointed equipment on the terminal includes:
in response to the pointed equipment being an in-vehicle equipment, determining whether the terminal is located inside the vehicle according to the relative position information; and
if the terminal is determined to be located inside the vehicle, displaying the user interface of the pointed equipment on the terminal.

9. The method according to claim 4, wherein displaying the user interface of the pointed equipment on the terminal includes:
obtaining permission information of the terminal, wherein the permission information of the terminal indicates a permission level of the terminal determined based on the relative position information, or the permission information of the terminal indicates a permission level pre-set for the terminal; and
in response to the permission information of the terminal meeting a permission requirement of the pointed equipment, displaying the user interface of the pointed equipment on the terminal.

10. The method according to claim 1, wherein displaying the information of the pointed equipment on the terminal includes:
displaying a user interface of the pointed equipment on the terminal; and
displaying the information of the pointed equipment through the user interface.

11. The method according to claim 1, wherein obtaining the direction information of the vehicle includes:
obtaining the direction information of the vehicle at least according to an angular velocity sensor and a magnetic sensor of the vehicle.

12. The method according to claim 1, wherein obtaining the direction information of the vehicle includes:
obtaining the direction information of the vehicle through a plurality of positioning modules of the vehicle.

13. The method according to claim 1, wherein obtaining the direction information of the terminal includes:
obtaining the direction information of the terminal at least according to an angular velocity sensor of the terminal and a magnetic sensor of the terminal.

14. The method according to claim 1, wherein obtaining the relative position information includes:
obtaining absolute position information of the terminal through a positioning anchor of a parking lot and a positioning module of the terminal matching the positioning anchor;
obtaining absolute position information of the vehicle through the positioning anchor of the parking lot and the positioning module of the vehicle matching the positioning anchor; and
determining the relative position information according to the absolute position information of the terminal and the absolute position information of the vehicle.

15. An electronic equipment comprising:
at least one processor; and
a memory communicatively connected to the at least one processor and storing processor-executable instructions that, when executed by the at least one processor, cause the processor to:
obtain direction information of a terminal and direction information of a vehicle based on a horizontal direction of a geomagnetic field;
obtain relative position information between the terminal and the vehicle;
determine relative direction information between the terminal and the vehicle according to the direction information of the terminal and the direction information of the vehicle;
determine a pointing line of the terminal according to the relative position information and the relative direction information;
determine area information pointed to by the terminal according to an error adjustment range and an intersection point between the pointing line and the vehicle;
determine a plurality of pieces of equipment in an area pointed by the terminal according to the area information and position information;
determine equipment pointed to by the terminal according to the relative position information, the relative direction information, and position information of the equipment of the vehicle relative to the vehicle; and
control the pointed equipment through the terminal or display information about the pointed equipment on the terminal.

16. The electronic equipment according to claim 15, wherein the processor is further configured to:
obtain movement information of the terminal;
in response to the movement information of the terminal satisfying a predetermined requirement, determine the equipment pointed to by the terminal according to the relative position information, the relative direction information, and the position information of the equipment of the vehicle relative to the vehicle.

17. The electronic equipment according to claim 16, wherein:
the movement information of the terminal includes a movement distance of the terminal relative to the vehicle; and
the predetermined requirement includes the movement distance being greater than a predetermined threshold.

18. The electronic equipment according to claim 15, wherein the processor is further configured to:
display a user interface of the pointed equipment on the terminal; and
control the pointed equipment through the user interface.

19. The electronic equipment according to claim 15, wherein the processor is further configured to:
display a user interface of the pointed equipment on the terminal; and
display the information of the pointed equipment through the user interface.

20. A non-transitory computer-readable storage medium storing a computer program that, when the computer program is executed by a processor, causes the processor to:
obtain direction information of a terminal and direction information of a vehicle based on a horizontal direction of a geomagnetic field;
obtain relative position information between the terminal and the vehicle;
determine relative direction information between the terminal and the vehicle according to the direction information of the terminal and the direction information of the vehicle;

determine a pointing line of the terminal according to the relative position information and the relative direction information;

determine area information pointed to by the terminal according to an error adjustment range and an intersection point between the pointing line and the vehicle;

determine a plurality of pieces of equipment in an area pointed by the terminal according to the area information and position information;

determine equipment pointed to by the terminal according to the relative position information, the relative direction information, and position information of the equipment of the vehicle relative to the vehicle; and control the pointed equipment through the terminal or display information about the pointed equipment on the terminal.

* * * * *